United States Patent [19]

Togami

[11] Patent Number: 4,794,250
[45] Date of Patent: Dec. 27, 1988

[54] SELF-GAPPING OPTICAL ENCODER
[75] Inventor: Chris K. Togami, San Jose, Calif.
[73] Assignee: Hewlett-Packard Company, Palo Alto, Calif.
[21] Appl. No.: 20,006
[22] Filed: Feb. 27, 1987
[51] Int. Cl.[4] .............................................. G01D 5/34
[52] U.S. Cl. .................................. 250/231 SE; 250/239
[58] Field of Search ............ 250/231 SE, 237 G, 239; 356/395; 340/347 P

[56] References Cited

U.S. PATENT DOCUMENTS 4,338,517  7/1982  Perrine ........................... 250/231 SE
4,475,034 10/1984  Maddox et al. ................. 340/347 P
4,556,792 12/1985  Kano et al. ....................... 250/237 G
4,652,748  3/1987  Siraky et al. ................... 250/231 SE Primary Examiner—David C. Nelms
Attorney, Agent, or Firm—Douglas A. Kundrat

[57] ABSTRACT

A modular optical encoder includes a housing, a rotatable cam-loaded cover, an emitter/detector module and a code wheel which is positionable upon the shaft of a motor. The code wheel is positioned automatically against the cover during attachment of the encoder to the motor to set the desired emitter and detector gaps. Once the code wheel is locked to the shaft, the cover may be rotated to disengage the cams and followers so that the code wheel is free to turn with the motor shaft.

13 Claims, 6 Drawing Sheets

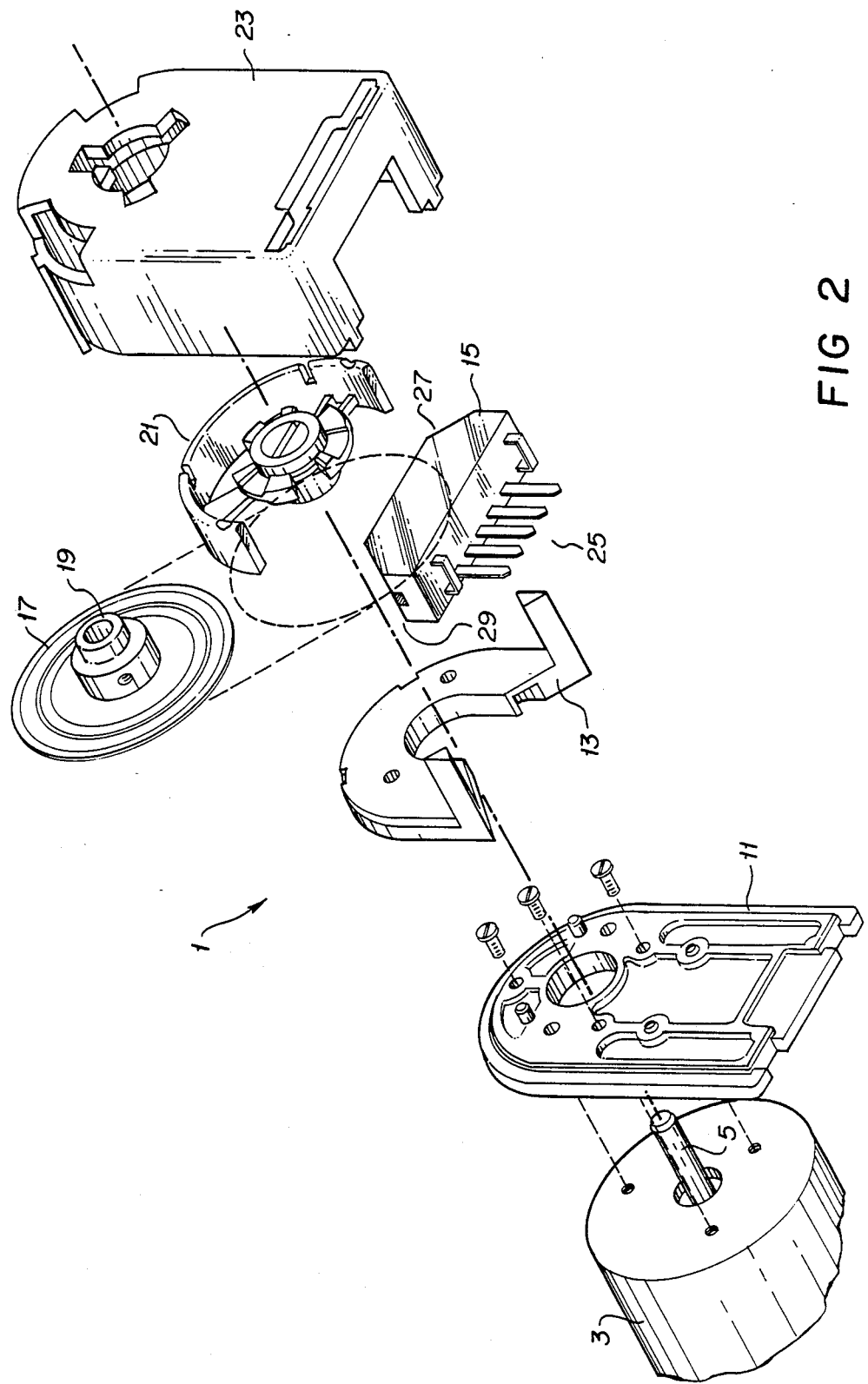

0
SELF-GAPPING OPTICAL ENCODER

BACKGROUND AND SUMMARY OF THE INVENTION

Optical encoders are widely used in instruments such as plotters to monitor the speed and shaft position of internal electric motors. As shown in U.S. Pat. No. 4,451,731, issued to Mark G. Leonard on May 29, 1984, an optical encoder includes a light emitter, a code wheel attached to the motor shaft, a light detector and a controller. The detector converts the light modulated by the rotating code wheel into a signal that the controller can use to monitor shaft rotation.

For maximum encoder sensitivity the code wheel must be positioned accurately between the emitter and the detector to set precisely the emitter-to-code wheel gap (emitter gap) and the code wheel-to-detector gap (detector gap). This has been both difficult and costly to achieve in the prior art because of the necessarily manual assembly of the code wheel onto the motor shaft. For example, positioning of the code wheel of a Dynamic Research Corp. model 730 encoder requires the use of a removable spacer between the code wheel and the encoder housing to set the gaps. Such installation is time consuming and prone to error and may cause damage to the code wheel. In the BEI Motion Systems Co. model M15 encoder, the need for a gapping spacer is eliminated by tightly fitting the code wheel onto the shaft and using a gapping rod to push the code wheel to the desired axial position. Unfortunately, such code wheels can only be positioned under dynamic conditions, and because of their flexibility, positioning may be inaccurate and damage to the code wheel may occur.

In accordance with the illustrated preferred embodiment of the present invention, a modular optical encoder includes a code wheel that is easily positioned without the need for gapping tools or dynamic conditions. The encoder includes a housing containing an emitter/detector module, a cover and a code wheel which is positioned between the emitter and the detector. The cover is rotatably mounted to the housing so that a cam on the cover may engage a follower on the housing to locate the cover at a predetermined axial position in the housing. During attachment of the motor to the encoder the motor shaft pushes the code wheel against the cover and thereby positions the code wheel axially on the motor shaft and sets the emitter and detector gaps. Once the code wheel is locked to the shaft the cover may be retracted to allow the code wheel to turn freely with the motor shaft. Tight manufacturing tolerances of the encoder components ensure that the gaps are accurate.

BRIEF DESCRIPTION OF THE DRAWINGS

FIG. 2 shows an exploded view of the encoder shown in FIG. 1.

DETAILED DESCRIPTION OF THE PREFERRED EMBODIMENT

Figure 1A:
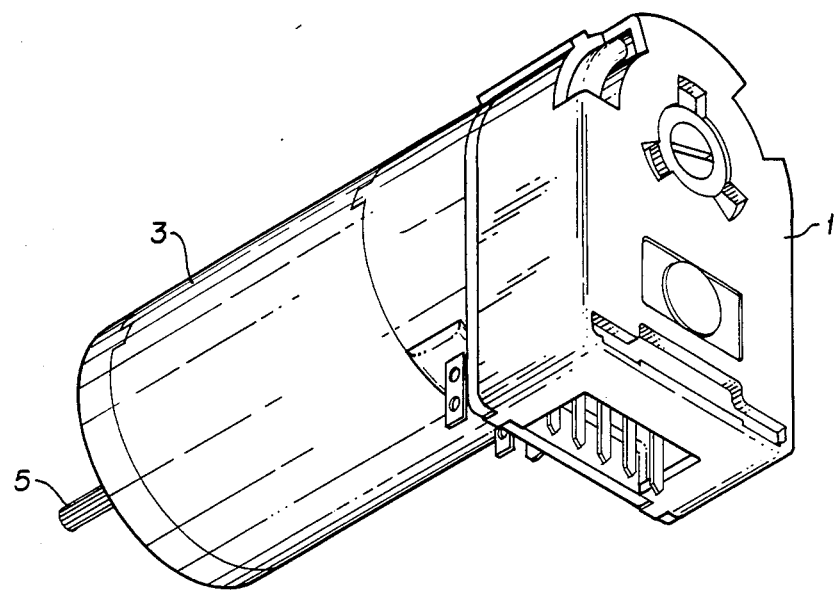
FIGS. 1A and 1B show a motor attached to an optical encoder which is constructed according to the preferred embodiment of the present invention.
Figure 1B:
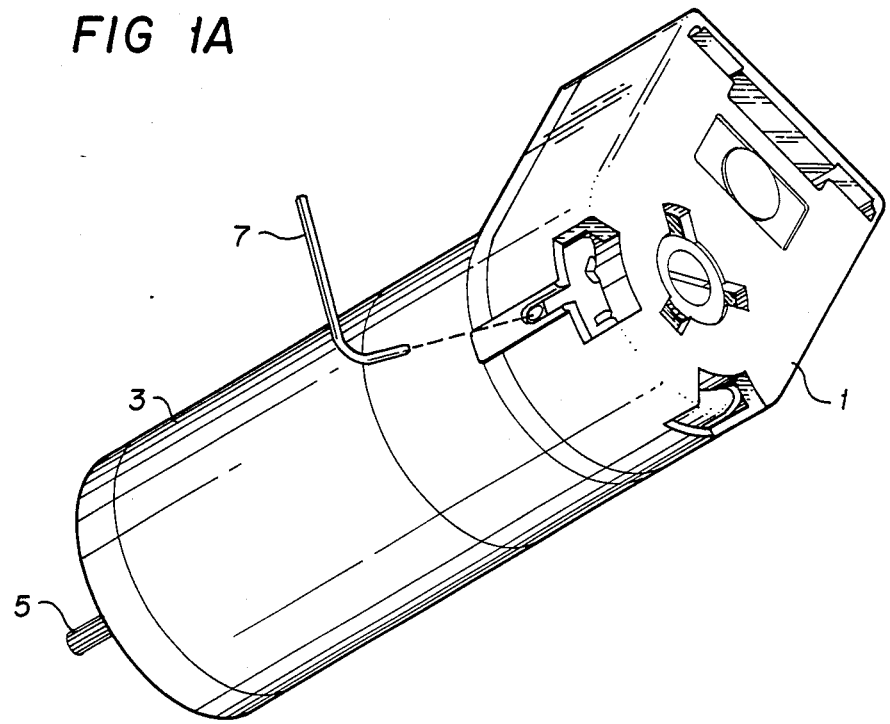

FIGS. 1A-1B show an optical encoder 1 which is constructed in accordance with the preferred embodiment of the present invention. The encoder 1 is attached to an electric motor 3 which includes a shaft 5. In many applications, such as plotters, it is very important to monitor precisely the position and rotational speed of the shaft 5. The exposed end of the shaft 5 provides the desired driving force while the opposite end is captured within the encoder 1 for position and speed monitoring.

FIG. 2 shows an exploded view of the encoder 1 shown in FIGS. 1A-1B. The encoder 1 includes a base 11, a retainer 13, a cover 21 and a housing 23, all of which may easily be fabricated from plastic using well known injection molding techniques. The encoder 1 also includes a code wheel 17 for modulating the light beam between emitter 27 and detector 29 portions of an emitter/detector module 15. While the use of a combined emitter/detector module is not required, it is important that the emitter and detector dimensions and relative spacing be tightly controlled. The code wheel 17 and the emitter/detector module 15 may be the same as those used in the Hewlett-Packard Company model HEDS-9XXX optical encoder.

Figure 3:
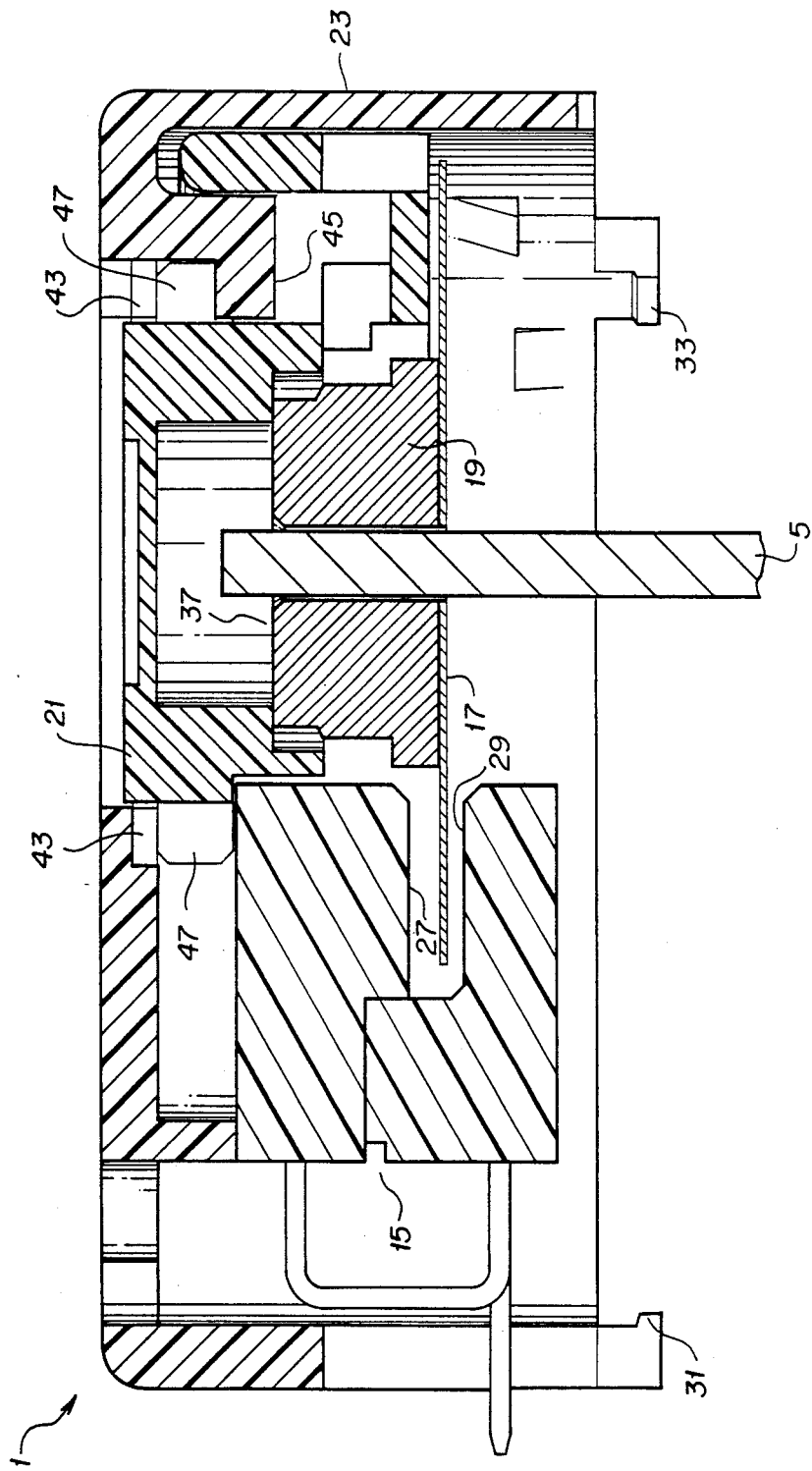
FIG. 3 shows a cross-sectional view of the encoder shown in FIG. 1 with the cover in the extended position.
Figure 7A:
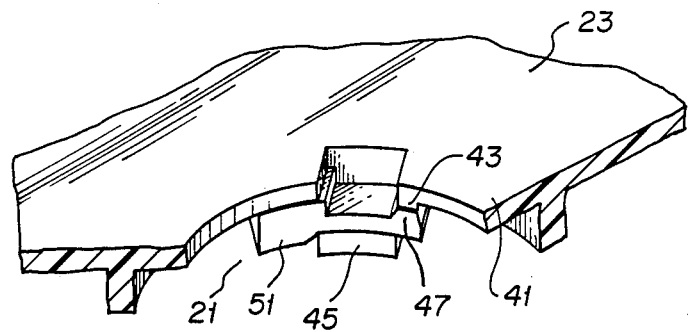
FIGS. 7A and 7B show detailed views of the interaction between the cover and the housing shown in FIGS. 5 and 6.

Initial assembly of the encoder 1 requires only a simple snap fit of the various components. The cover 21 is first fit into the housing 23 as shown in FIGS. 3 and 7A. The code wheel 17 is next placed in the path between the emitter 27 and the detector 29 of the module 15. Both the code wheel 17 and the module 15 are placed inside the housing 23 and the module 15 is press fitted into the housing 23. The retainer 13 is then snap fitted into the housing 23 to protect the code wheel 17. The base 11 may be left loose or snap fitted to the housing 23 for initial storage and shipment prior to attachment to the motor 3. Although the code wheel 17 is now located between the emitter 27 and the detector 29, it is unsecured and free to move slightly in axial and radial directions.

In order to attach the encoder 1 to the motor 3, the base 11 is first removed from the housing 23 and is then attached to the motor 3 by three screws. The housing 23 (including the cover 21, the emitter/detector module 15, the code wheel 17 and the retainer 13) is aligned to the shaft 5 and the base 11 and is then pushed against the motor 3 and snap fit attached to the base 11.

FIG. 3 shows a cross-sectional view of the housing 23 which is attached to the base 11 (not shown) by snap feet 31, 33. The base 11 is in turn attached to the motor 3 (not shown). For the sake of clarity, the retainer 13 is not shown in FIG. 3. As the shaft 5 is inserted into the code wheel hub 19 during assembly, the code wheel hub 19 is forced against a lower surface 37 of the cover 21. The shaft 5 extends from the motor 3 through the code wheel 17 and hub 19 and possibly into a recess within the cover 21. The tightness of the fit of the shaft 5 onto the hub 19 may be set by varying the internal diameter of the hub 19 or by including a rubber or plastic friction ring as part of the hub 19. The code wheel 17 may be fixed to the shaft 5 using a set screw (not shown) tightened by a hex wrench 7 shown in FIG. 1. In addition, the hex wrench 7 may be levered to force the hub 19 tightly against the lower surface 37 if necessary.

FIG. 3 shows the cover 21 extending into the housing 23 a predetermined distance which is defined by the dimensions of the housing 23 and the cover 21. With the cover 21 in this extended position, the hub 19 is forced against a lower surface 37 of the cover 21 and the axial position of the code wheel 17 is defined by the dimensions of the code wheel 17 and the hub 19 and by the predetermined distance. Therefore, the emitter and detector gaps are determined solely by the dimensions of the housing 21, the cover 23, the code wheel 17, the hub 19 and the emitter/detector module 15. Since it is relatively simple to maintain tight tolerances with modern manufacturing techniques, the emitter and detector gaps may be set accurately and repeatably without the need for complicated or timeconsuming assembly processes.

Figure 4:
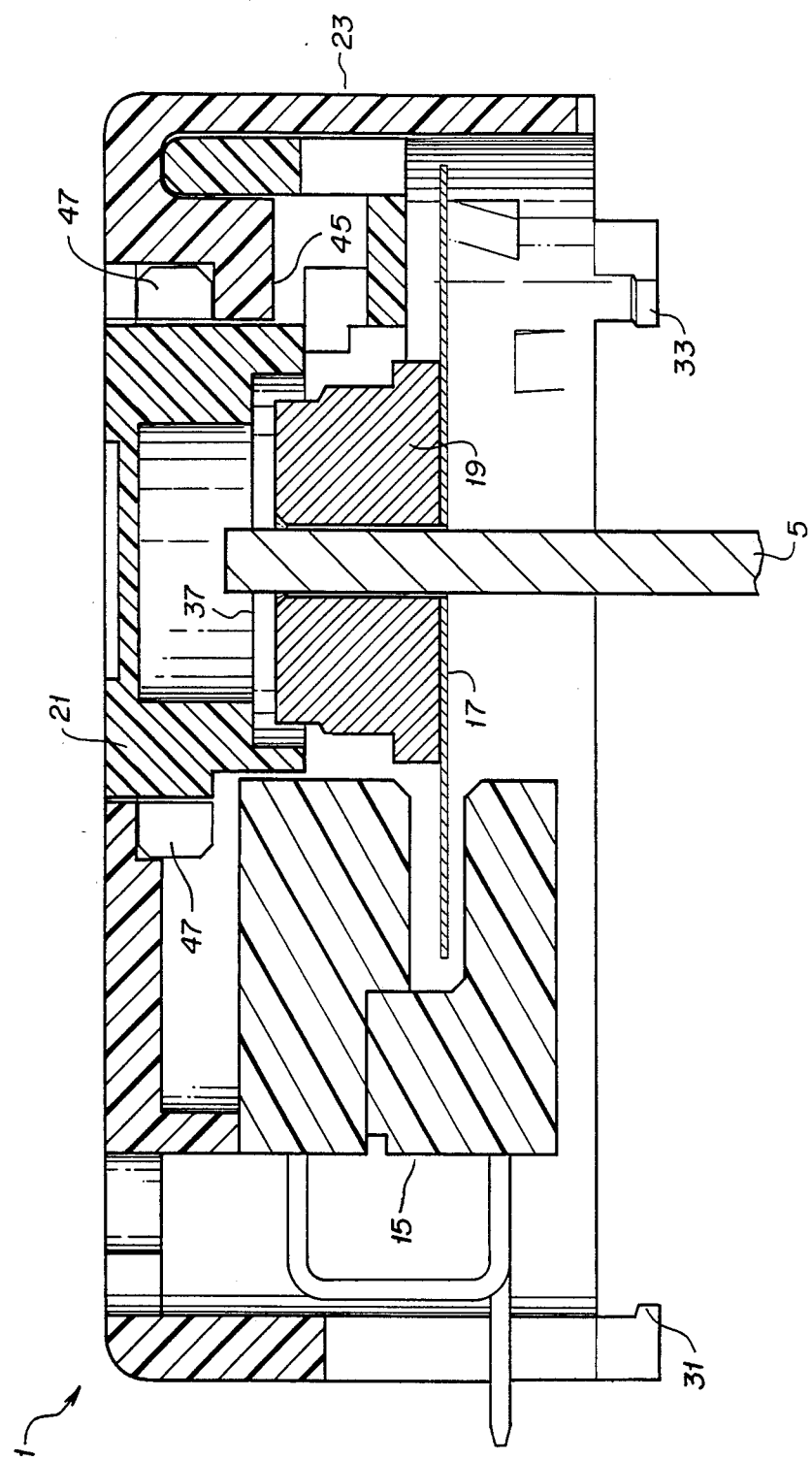
FIG. 4 shows a cross-sectional view of the encoder shown in FIG. 1 with the cover in the retracted position.

FIG. 4 shows a cross-sectional view of the encoder 1 in which the cover 21 is in an operational or retracted position. With the code wheel 17 fixed to the shaft 5 in the desired axial position, the cover 21 should be retracted to allow the code wheel 17 and hub 19 to rotate freely with the shaft 5.

Figure 5:
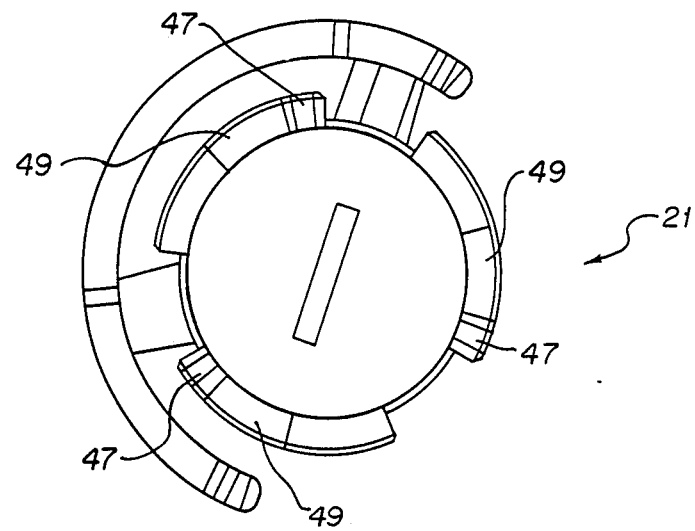
FIG. 5 shows a top view of the cover shown in FIG. 1.
Figure 6:
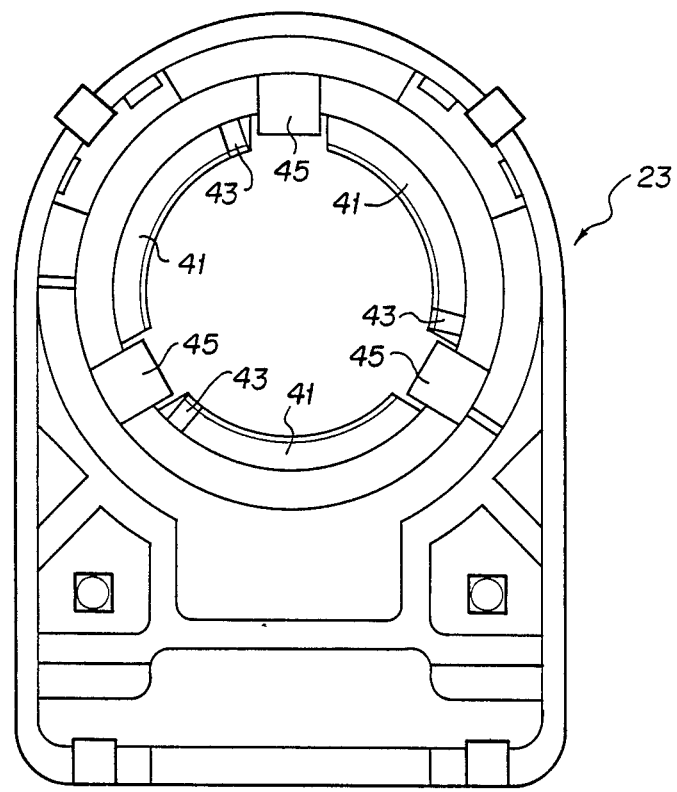
FIG. 6 shows a bottom view of the housing shown in FIG. 1.
Figure 7B:
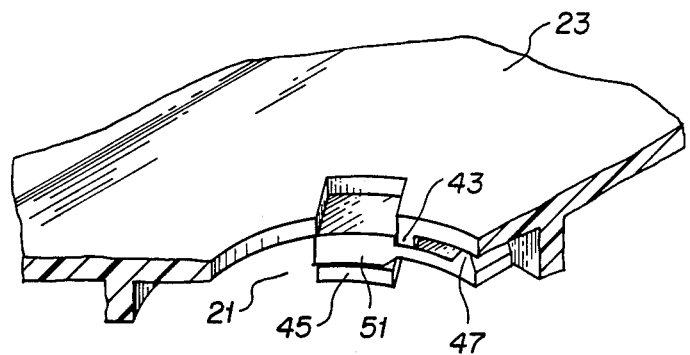

FIG. 5 shows a top view of the cover 21 including three cams 47 rising from a peripheral surface 49. FIG. 6 shows a bottom view of the housing 23 including rails 41 and lower followers 45 for securing the cover 21. The housing 23 also includes three followers 43 which may be aligned radially with the cams 47 of the cover 21. FIGS. 7A-7B show detail views of the interaction of the cover 21 and the housing 23.

FIGS. 3-7 depict the interaction of the cover 21, the housing 23 and the hub 19. FIGS. 3 and 7A show the cover 21 rotated to the extended position in which the cams 47 engage the followers 43 to force the cover 21 axially downward to the predetermined position within the housing 23. The peripheral ring 49 of the cover 21 is secured within the housing 23 between the rails 41 and the lower followers 45. FIGS. 4 and 7B show the cover 21 rotated to the retracted position in which the cams 47 are disengaged from the followers 43. The bottom side of the peripheral ring 49 includes raised secondary cams 51 which engage the lower followers 45. The engagement of the secondary cam 45 against the stop 45 forces the cover 21 axially upward to the retracted position.

I claim:

1. An optical encoder for attachment to a motor and for detecting angular position of a shaft of the motor, comprising:
   a housing, capable of attachment to the motor at an attachment end and of receiving the shaft along a central axis, having a reference surface orthogonal to the axis and axially distant from the attachment end;
   a cover, rotatably mounted within the housing between the reference surface and the attachment end, for axial movement between a retracted position near the reference surface and a set position farther from the reference surface, a portion of the cover being accessible from outside the housing for initiation of rotation;
   an emitter separated from a detector by a distance, the emitter and detector being fixedly aligned together along a path crossing the distance and parallel to the axis, the emitter and detector being mounted within the housing at a predetermined location relative to the reference surface;
   a code wheel, axially alignable within the housing and having a central hub for receiving the shaft along the axis, positioned to cross the path between the emitter and the detector;
   fixing means, attached to the hub, for attaching the code wheel to the shaft such that light projected form the emitter to the detector is modulated by the code wheel as the shaft rotates; and
   a retainer, attached to the housing distant from the reference surface and near the attachment end, for receiving the shaft and for completing enclosure of the cover, emitter, detector and code wheel within the housing such that the optical encoder is self-contained.

2. An encoder as in claim 1, wherein:
   the cover, when rotated to the set position, urges the code wheel to a desired axially located gap position between the emitter and the detector; and
   the cover, when rotated to the retracted position, avoids the code wheel such that the code wheel is free to rotate with the shaft at the desired gap position.

3. An encoder as in claim 2, wherein:
   the housing includes a first follower;
   the cover includes a first cam, engageable with the first follower; and
   such that the cover is located at the set position when the first cam and the first follower are engaged.

4. An encoder as in claim 2, wherein:
   the housing further comprises a second follower axially positioned in a direction opposite the first follower;
   the cover further comprises a second cam axially positioned in a direction opposite the first cam and alignable with the second follower; and
   such that the cover is located at the retracted position when the second cam and second follower are aligned.

5. An encoder as in claim 3, wherein the emitter and detector form a single and rigid pre-aligned module.

6. An encoder as in claim 3, wherein the retainer is snap-fit attachable to the housing.

7. An encoder as in claim 3, further comprising a plate, attachable to the housing at the attachment end and to the motor, for attaching the encoder to the motor.

8. An encoder as in claim 6, further comprising a plate, attachable to the housing at the attachment end and to the motor, for attaching the encoder to the motor.

9. An encoder as in claim 2 wherein the fixing means comprises a friction ring attached internal to the control wheel hub.

10. An encoder as in claim 2, wherein the fixing means comprises a set screw threaded through the control wheel hub such that the shaft may be urged tightly within the hub.

11. An encoder as in claim 8, wherein the fixing means comprises a set screw threaded through the control wheel hub such that the shaft may be urged tightly within the hub.

12. An encoder as in claim 10, wherein the housing further comprises an aperture for insertion of a tool for tightening the set screw such that the code wheel may be fixed to the hub without disassembly.

13. An encoder as in claim 11, wherein the housing further comprises an aperture for insertion of a tool for tightening the set screw such that the code wheel may be fixed to the hub without disassembly.

* * * * *